(12) United States Patent
Day et al.

(10) Patent No.: US 12,726,149 B2
(45) Date of Patent: Sep. 1, 2026

(54) SELECTIVE MOTOR DERATING USING ESTIMATED INTERNAL TEMPERATURE OF INVERTER BULK CAPACITOR

(71) Applicant: GM GLOBAL TECHNOLOGY OPERATIONS LLC, Detroit, MI (US)

(72) Inventors: Dylan M. Day, Auburn Hills, MI (US); Matthew From, Royal Oak, MI (US); Young J. Kim, Troy, MI (US); Daniel J. Berry, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 904 days.

(21) Appl. No.: 18/153,386

(22) Filed: Jan. 12, 2023

(65) Prior Publication Data

US 2024/0243682 A1 Jul. 18, 2024

(51) Int. Cl.
*H02M 7/5395* (2006.01)
*B60L 53/10* (2019.01)
*H02M 7/00* (2006.01)
*H02P 27/08* (2006.01)

(52) U.S. Cl.
CPC .............. *H02P 27/08* (2013.01); *B60L 53/11* (2019.02); *H02M 7/003* (2013.01)

(58) Field of Classification Search
CPC ..... B60L 53/11; H02M 7/5395; H02M 7/003; H02M 1/327; H02M 7/5387; H02P 27/08
USPC .......................................................... 318/108
See application file for complete search history.

(56) References Cited

U.S. PATENT DOCUMENTS

2011/0050141 A1* 3/2011 Yeh ........................ H02P 29/664 318/434
2011/0279074 A1* 11/2011 Yeh ........................ G01K 13/08 318/473
2018/0254734 A1* 9/2018 Kano ................... B62D 5/0496
2023/0244257 A1* 8/2023 Anderson ............... B60L 3/003 320/134
2024/0109434 A1* 4/2024 Thongam ................ B60L 50/40

* cited by examiner

*Primary Examiner* — Gabriel Agared
(74) *Attorney, Agent, or Firm* — Quinn IP Law

(57) ABSTRACT

An electric drive system includes a direct current (DC) power supply, a rotary electric machine connectable to a load, a power inverter module (PIM), and a controller. The PIM includes a bulk capacitor connected to the DC power supply, along with a plurality of power switches. Each power switch has an output side connected to the electric machine and an input side connected to the bulk capacitor. The controller executes a method to estimate an internal temperature of the bulk capacitor as an estimated internal temperature. This occurs in response to an enabling condition. The controller then selectively derates the electric machine in response to the estimated internal temperature.

20 Claims, 6 Drawing Sheets

SELECTIVE MOTOR DERATING USING ESTIMATED INTERNAL TEMPERATURE OF INVERTER BULK CAPACITOR

INTRODUCTION

Rotary electric machines generate torque to power a load or produce electricity in a myriad of electromechanical systems. For example, electric traction motors are often used to provide motor output torque to one or more powered road wheels of an electric or hybrid electric motor vehicle. Electric motors are also used for propelling other types of vehicles and mobile platforms, such as but not limited to watercraft, aircraft, and rail vehicles/trains. Likewise, electric motors perform work in a wide range of non-vehicular systems, including but not limited to powerplants, hoists, and conveyor systems.

When an electric motor is embodied as a single phase or a polyphase alternating current (AC) electric machine, the electric motor is connected to a battery pack or another application-suitable direct current (DC) power supply via a power inverter. ON/OFF conducting states of individual semiconductor power switches of the inverter are individually controlled using an application-suitable switching control technique, e.g., pulse-width modulation (PWM). High-frequency switching of the power switches ultimately converts a DC voltage from the DC power supply into an AC output voltage. The AC output voltage is then applied to phase windings of the electric motor to cause machine rotation.

In addition to the above-noted power switches, a typical inverter circuit is equipped with a bulk capacitor. A bulk capacitor—also referred to in the art as a DC link capacitor—acts as a buffer or filter between the DC power supply and a connected electrical load. In a high-voltage battery electric system, a wound anode and cathode may be situated within a protective outer casing and separated from each other by a dielectric material. Positive and negative electrode terminals of the bulk capacitor are connected to mating terminals of the DC power supply, such that a DC link voltage of the bulk capacitor initially equals a voltage level of the DC power supply. When the DC power supply begins to discharge, such as when powering the above-noted electric motor, the bulk capacitor helps limit voltage fluctuations or ripple on a DC voltage bus.

SUMMARY

Disclosed herein are systems and related methods for estimating an internal temperature of a bulk capacitor of an inverter circuit. As exemplified herein, the inverter circuit may be used as part of an electric drive system or another battery electric system without limiting the present teachings to such constructions. An onboard electronic control unit ("controller") is configured to perform one or more control actions using the estimated internal temperature of the bulk capacitor, with an exemplary control action being the selective derating of an electric traction motor in one or more embodiments.

As appreciated in the art, the construction and limited internal volume of a bulk capacitor generally precludes integration of physical temperature sensors therewithin. In some electric drive systems, the bulk capacitor may experience periods of elevated temperature, for instance due to usage scenarios in which the electric drive system is operated well beyond its intended torque and/or speed limits. The bulk capacitor under such conditions could suffer thermal stress, which in turn could lead to thermal damage and possible failure. The present control strategy helps to avoid this undesirable result by estimating the internal temperature of the bulk capacitor and using the estimated internal temperature during selective local torque derating operations of the electric traction motor. Extension of the present strategy to multi-inverter systems could likewise ensure proper thermal balancing of loads on the associated PIMs and electric traction motors as described herein.

In particular, an aspect of the present disclosure includes an electric drive system having a direct current (DC) power supply, a rotary electric machine connectable to a load, a power inverter module (PIM), and a controller. The PIM includes a bulk capacitor and a plurality of power switches. The bulk capacitor is connected to the DC power supply. The power switches have an output side connected to the rotary electric machine and an input side connected to the bulk capacitor. The controller is programmed, in response to an enabling condition, to estimate an internal temperature of the bulk capacitor as an estimated internal temperature, and to selectively derate the rotary electric machine in response to the estimated internal temperature.

The DC power supply in one or more embodiments includes a traction battery pack for use aboard a motor vehicle. In such implementations, the electric machine includes an electric traction motor and the load includes one or more road wheels of the motor vehicle. The enabling condition may include a key-on event of the motor vehicle. The controller may be programmed to record the estimated internal temperature as a recorded key-off temperature in response to a key-off event of the motor vehicle. The key-off event transitions the motor vehicle into an OFF operating state. The controller may temporarily estimate the internal temperature of the PIM using the recorded key-off temperature while the motor vehicle is in an OFF operating state.

In one or more implementations, the controller is programmed with a two-dimensional lookup table that relates a modulation index of the PIM and a power factor of the PIM to a capacitor current ratio. The controller may then estimate a root mean square (RMS) current of the capacitor using the capacitor current ratio, and estimate the internal temperature of the bulk capacitor using the RMS current.

The controller may be programmed to control an ON/OFF switching state of the power switches using a predetermined pulse width modulation (PWM) strategy, e.g., six-step PWM. In such an approach, the controller may estimate the internal temperature of the PIM using a scalar factor selected from a one-dimensional lookup table based on the predetermined PWM strategy.

The controller in one or more embodiments may be programmed with a power loss model configured to output a power loss value of the bulk capacitor in response to a set of input signals. The input signals may include a switching frequency of the power switches, a modulation index of the PIM, a power factor of the PIM, a d-axis current command, a q-axis current command, a DC voltage from the DC power supply, and the predetermined PWM strategy.

The controller as set forth herein may also include a thermal model of the bulk capacitor. The thermal model in turn may include a cross-coupled network of temperature nodes of the bulk capacitor and the PIM. The controller in such an embodiment may estimate the internal temperature of the bulk capacitor using the thermal model.

The PIM in a possible multi-inverter construction of the electric drive system could include a plurality of PIMs and the rotary electric machine could include a plurality of rotary electric machines. Each rotary electric machine in such embodiments may be connected to a corresponding one of the PIMs. The controller may allocate an output torque from each respective one of the rotary electric machines to the load based at least in part on the estimated internal temperature of the bulk capacitor.

Also disclosed herein is a method for use with an electric drive system of the type summarized above. An embodiment of the method includes estimating, via a controller in response to an enabling condition, an internal temperature of a bulk capacitor of a PIM of the electric drive system. The electric drive system in this embodiment includes the PIM, a DC power supply connected to the PIM, and a rotary electric machine connectable to the PIM and to a load. The method may include selectively derating the rotary electric machine via switching control a plurality of power switches of the PIM in response to the estimated internal temperature.

The method in accordance with another aspect of the present disclosure includes estimating, via a controller of the motor vehicle in response to an enabling condition, an internal temperature of a bulk capacitor of a PIM of an electric drive system. The electric drive system includes the PIM, a traction battery pack connected to the PIM, and a polyphase rotary electric traction motor connectable to the PIM and to one or more road wheels of a motor vehicle. The method includes selectively derating a maximum torque and/or speed of the polyphase electric machine, via switching control a plurality of power switches of the PIM, in response to the estimated internal temperature.

Estimating the internal temperature of the bulk capacitor in this particular implementation includes extracting a capacitor current ratio from a two-dimensional lookup table that relates a modulation index of the PIM and a power factor of the PIM to the capacitor current ratio, and calculating the RMS current of the capacitor using the capacitor current ratio. The method may include determining a power loss value of the bulk capacitor using a thermal model of the bulk capacitor and a power loss model of the bulk capacitor, with the power loss model having a set of input signals including a switching frequency of the power switches, a modulation index of the PIM, a power factor of the PIM, a d-axis current command, a q-axis current command, a DC voltage from the DC power supply, and a predetermined pulse width modulation (PWM) strategy. The method further includes estimating the internal temperature of the bulk capacitor using the RMS current and the power loss value.

The above features and advantages, and other features and advantages, of the present teachings are readily apparent from the following detailed description of some of the best modes and other embodiments for carrying out the present teachings, as defined in the appended claims, when taken in connection with the accompanying drawings.

Figure 1:
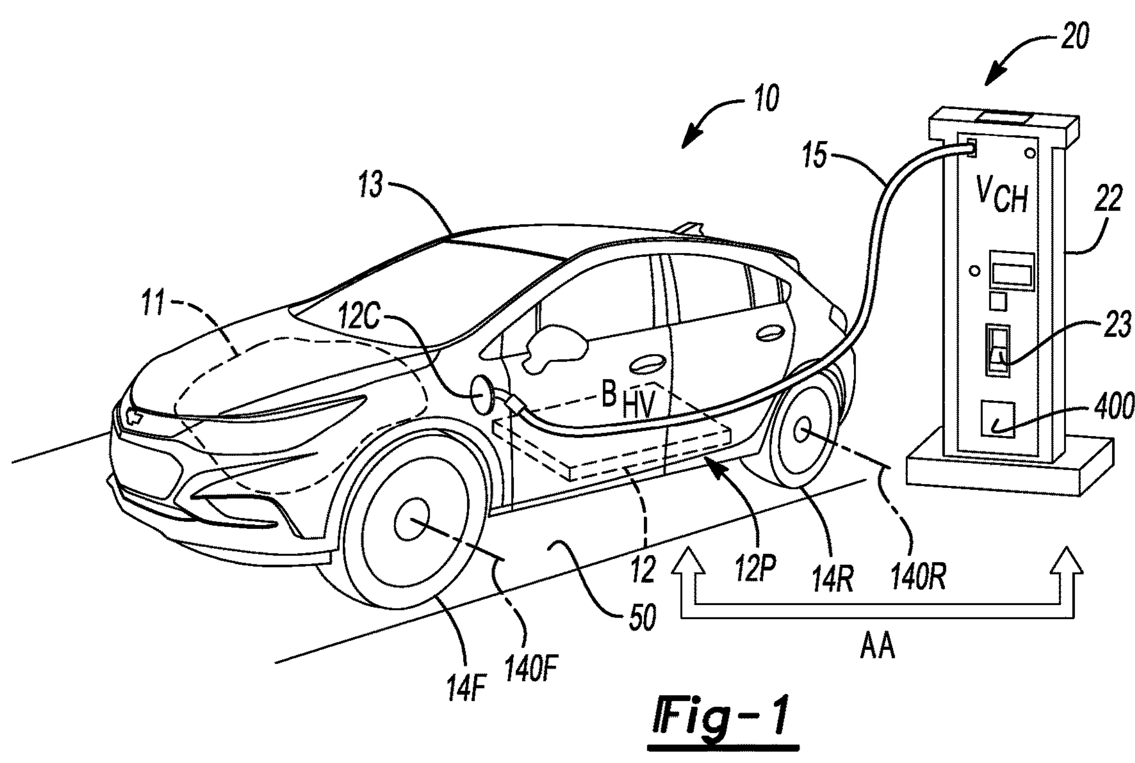
FIG. 1 illustrates a motor vehicle equipped with an electric drive system configured in accordance with an aspect of the present disclosure.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

Referring to the drawings, wherein like reference numerals correspond to like or similar components throughout the several Figures, FIG. 1 illustrates a motor vehicle 10 having an electric drive system 11. The electric drive system 11 includes a high-voltage power supply 12P, which in the non-limiting embodiment of FIG. 1 is configured as a high-voltage traction battery pack ($B_{HV}$) 12. In such an embodiment, the term "high-voltage" may encompass battery voltages of about 300 volts (V) or more, i.e., a voltage level suitable for vehicular propulsion. The electric drive system 11 also includes at least one power inverter module (PIM) 18 constructed as depicted in FIGS. 2 and 3.

Figure 2:
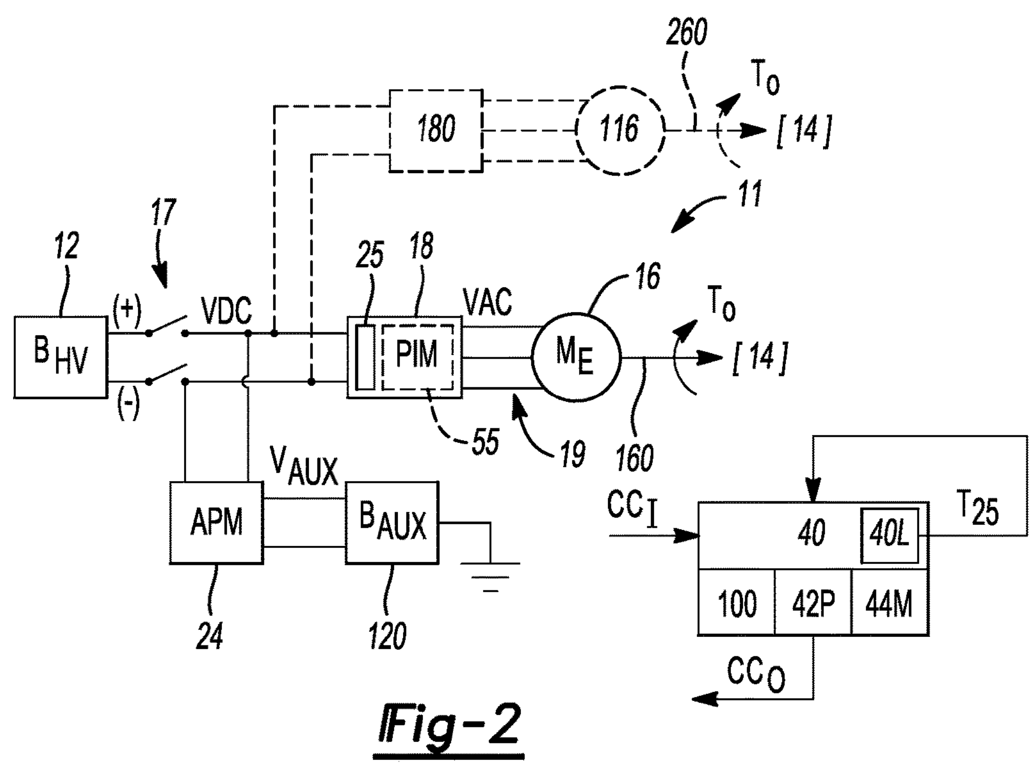
FIG. 2 illustrates a representative embodiment of the electric drive system of FIG. 1 including a power inverter module (PIM) having a bulk capacitor whose internal temperature is estimated and applied as set forth herein.
Figures 3, 4:
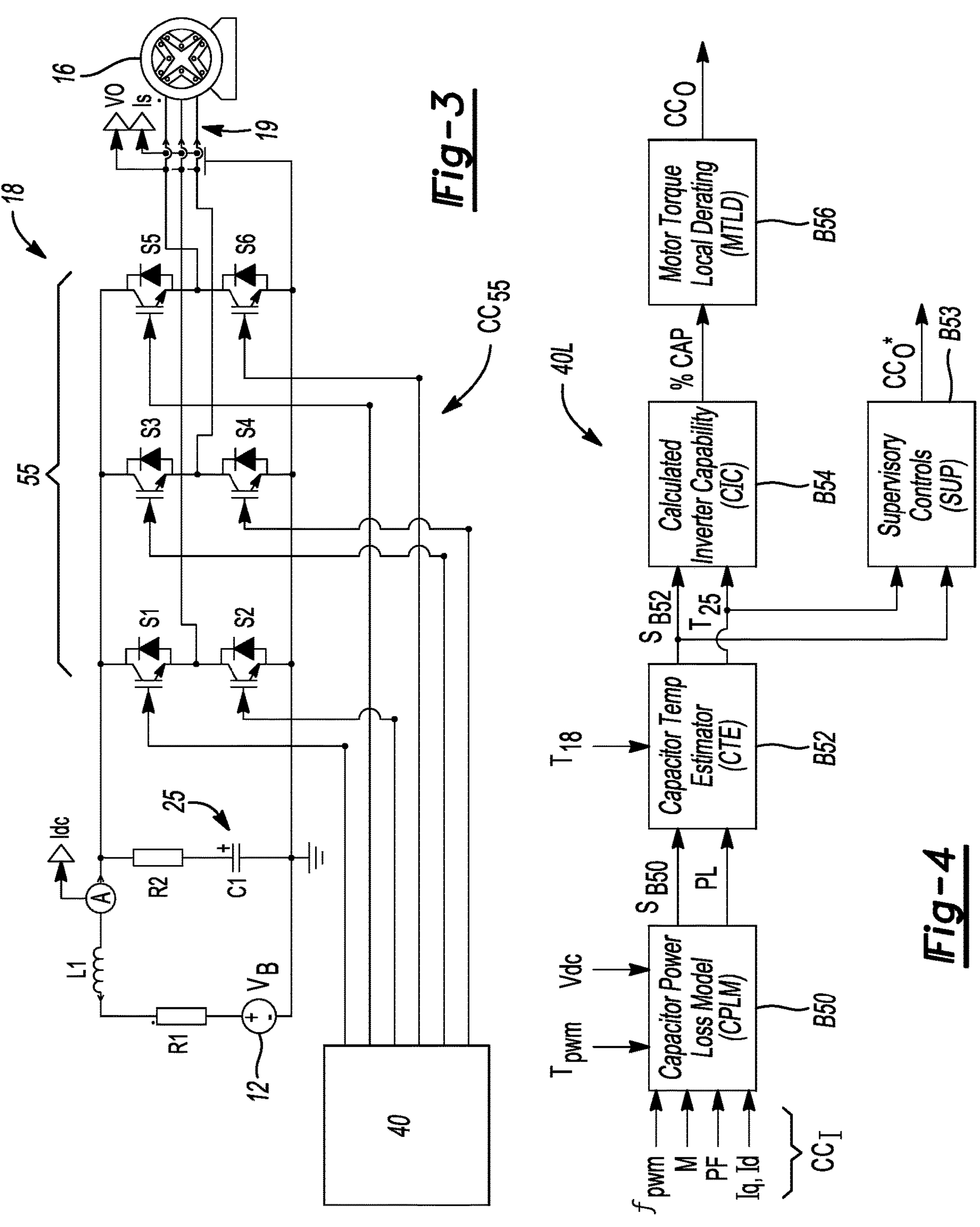
FIG. 3 is a representative circuit diagram of the PIM and other components of the electric drive system shown in FIG. 2.
FIG. 4 is a logic flow diagram describing exemplary control logic for estimating an internal temperature of a bulk capacitor of the electric drive system shown in FIG. 3.

Referring briefly to FIG. 2, the PIM 18 includes a bulk capacitor 25 as part of its internal circuit construction. As noted above, limited packaging space within the bulk capacitor 25 generally precludes integration of a physical temperature sensor for the purpose of directly measuring an internal temperature of the bulk capacitor 25. The present strategy therefore estimates the internal temperature of the bulk capacitor 25 in accordance with a method 100, an example of which is described in detail below with reference to FIGS. 7 and 8, using processing functionality of an onboard controller 40. Temperature estimation may be performed by the controller 40 using the representative logic 40L of FIG. 4. The controller 40 ultimately executes one or more control functions using the estimated internal temperature, including selectively derating an electric traction motor (ME) 16 and/or an optional additional electric traction motor 116.

Referring again to the exemplary embodiment of FIG. 1, the motor vehicle 10 may be constructed as a battery electric vehicle having a vehicle body 13 connected to/supporting the traction battery pack 12. During discharge/propulsion modes, electrical energy stored in constituent electrochemical battery cells (not shown) of the traction battery pack 12 is used to power rotation of one or more road wheels 14F and/or 14R of the motor vehicle 10, with the road wheels 14F operating as front road wheels and the road wheels 14R operating as rear road wheels in the illustrated four-wheel configuration. Other embodiments of the motor vehicle 10 may have more or fewer road wheels, as appreciated in the art. Additionally, some of the road wheels 14F and/or 14R may be undriven/freewheeling, e.g., in rear-wheel drive (RWD) or front-wheel drive (FWD) configurations, or the road wheels 14F and 14R may be driven/powered, e.g., in an all-wheel drive (AWD) or four-wheel drive (4WD) configuration. Rotation of the road wheels 14F and/or 14R about a corresponding drive axis 140F or 140R during discharge modes ultimately propels the motor vehicle 10 along a road surface 50.

The traction battery pack 12 is depicted in FIG. 1 as it would appear during a charging mode. During such modes, the motor vehicle 10 is stationary and the traction battery pack 12 is recharged via a charging voltage (VCH) from an offboard charging station 20, as indicated by double-headed arrow AA. As charging proceeds, the controller 40 and a corresponding controller 400 of the offboard charging station 20 mutually communicate using low-voltage signals, as appreciated in the art. The offboard charging station 20 typically includes a weatherproof charging cabinet 22 having a cradle 23. The charging voltage (VCH) is provided over an electrical cable 15. A charge coupler (not shown) disposed on an end of the electrical cable 15 connects to mating receptacles of a charging port 12C arranged on the vehicle body 13. When the charging process is complete, an operator disconnects the charge coupler, closes a cover to the charging port 12C, and sets the charge coupler into the cradle 23 of the charging cabinet 22 for later use.

Turning once again to FIG. 2, representative hardware components of the electric drive system 11 of FIG. 1 include the traction battery pack ($B_{HV}$) 12, the PIM 18, and the electric traction motor 16, the latter of which is connected to a rotatable output member 160. Certain configurations of the electric drive system 11 may include more than one motor, and possibly more than one inverter. For instance, a PIM 180 may be used in conjunction with the electric traction motor 116 to deliver torque (arrow $T_O$) to an additional output member 260. The output members 160 and 260 in one or more possible embodiments could be respectively connected to the front and rear drive axles 140F and 140R of FIG. 1, or the PIM 118 and electric traction motor 116 could be wheel-mounted in other configurations within the scope of the disclosure. The following description of the electric traction motor 16 and the PIM 18 is therefore intended to apply to optional "multi-inverter" systems when the electric drive system 11 is so configured.

The representative PIM 18 shown in FIG. 2 includes power switches 55 collectively configured and controlled as described in further detail below with reference to FIG. 3. The traction battery pack 12 is electrically connected to the PIM 18 via positive (+) and negative (−) high-voltage contactors 17. Although omitted for illustrative simplicity, the traction battery pack 12 is also selectively connectable to positive and negative terminals of a DC charge receptacle and input switches, with such a DC charge receptacle being electrically connected to the DC charge port 12C of FIG. 1 during charging modes of the traction battery pack 12. The charging voltage (VCH) is thus supplied by the offboard charging station 20 through the charge port 12C (FIG. 1) via such positive and negative links and input switches.

During drive modes, the PIM 18 is controlled with pulse width modulation (PWM) or another application-suitable switching control technique to energize one or more phase windings 19 of the electric traction motor 16. As depicted, the electric traction motor 16 is a polyphase alternating current (AC) motor, in this instance exemplified as a three-phase motor. The energized electric traction motor 16 generates and transfers output torque (arrow $T_O$) to the connected output member 160. The output member 160 for its part is mechanically coupled to a load, which in the representative embodiment of FIG. 1 includes one or more of the front road wheels 14F and/or the rear road wheels 14R. Torque delivery to the front/rear road wheels 14F/14R is indicated as "[14]" in FIG. 2 for simplicity.

The electric drive system 11 may include additional electrical components for powering various systems or functions aboard the motor vehicle 10. For example, the traction battery pack 12 may be connected to an accessory power module (APM) 24 in the form of a DC-DC converter suitable for reducing a level of a DC voltage (VDC) of the traction battery pack 12, e.g., 300V or more as noted elsewhere above, to a typical 12-15V auxiliary voltage level. An auxiliary battery ($B_{AUX}$) 120 such as a lead-acid auxiliary battery may be electrically connected to the APM 24, with internal switching operation of the APM 24 ensuring that the auxiliary battery 120 remains charged via an auxiliary voltage (VAUX), or that one or more low-voltage systems aboard the motor vehicle 10, e.g., a radio, lighting, display screen, etc., are provided with power sufficient for energizing their respective functions.

Within the representative electric drive system 11 of FIG. 2, the controller 40 receives input signals (arrow $CC_I$) from the various components. In response to the input signals (arrow $CC_I$), the controller 40 outputs a set of control signals (arrow $CC_O$). While the control signals (arrow $CC_O$) may include electronic signals having functions beyond the scope of the present disclosure, at least some of the control signals (arrow $CC_O$) may be based on an estimated internal temperature (arrow $T_{25}$) of the bulk capacitor 25 and used herein to selectively derate the electric traction motor 16.

To that end, one or more processors 42P of the controller 40 are configured to execute the present method 100 as algorithm or algorithms, with the method 100 possibly implemented as control logic 40L or computer-readable instructions from memory 44M. Such instructions may be stored in the memory 44M, which may include tangible, non-transitory computer-readable storage medium, e.g., magnetic or optical media, CD-ROM, and/or solid-state/semiconductor memory (e.g., various types of RAM or ROM). The term "controller" and related terms such as control module, module, control, control unit, processor, and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory components of the memory 44M are capable of storing machine-readable instructions in the form of one or more software or firmware programs or routines, combinational logic circuit(s), input/output circuit(s) and devices, signal conditioning and buffer circuitry and other components that can be accessed by one or more processors 42P to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example about 50-100 microsecond (ms) intervals during ongoing operation. Alternatively, routines may be executed in response to occurrence of a triggering event.

Referring to FIG. 3, the power switches 55 located inside of the PIM 18 are constructed as application-suitable semiconductor switching device, e.g., insulated gate bipolar transistors (IGBTs) as shown, or alternatively as metal oxide semiconductor field-effect transistors (MOSFET), thyristors, or other electronic switching devices having controllable conducting (ON) modes and blocking (OFF) modes set via corresponding switching control signals ($CC_{55}$) by the controller 40. In a typical three-phase configuration of the electric traction motor 16, the power switches 55 include upper/high switches S1, S3, and S5 and lower/low switches S2, S4, and S6 arranged in a switching die (not shown), as appreciated in the art. The corresponding switching control signals ($CC_{55}$) thus turn the switches S1-S6 on and off at a predetermined switching interval to ultimately output an alternating current waveform to the phase windings 19.

The traction battery pack 12 in this particular configuration provide a battery voltage (VB) as an input to the PIM 18. The traction battery pack 12 may be modeled offline as having an associated resistance and inductance, which are respectively represented as resistor R1 and inductor L1 in FIG. 3. Also shown is the bulk capacitor (C1) 25 with positive (+) and negative (−) terminals and an equivalent series resistor (R2). For control of the PIM 18, a current sensor (A) in communication with the controller 40 is operable for measuring a battery current (IDC) may be situated between the traction battery pack 12 and the PIM 18.

The PIM 18 is connected to the traction battery pack 12, together with the resistor R2 and the bulk capacitor 25, the internal temperature of which is estimated herein and thereafter used by the controller 40 to situationally derate the electric traction motor 16. The power switches 55 are connected to the phase windings 19 of the electric traction motor 16, as well as to the controller 40 or a dedicated gate driver circuit (not shown). Parameters that are sensed proximate the traction battery pack 12 may include the DC current transferred from the traction battery pack 12 during a drive mode, with the measured current at this particular location represented herein as Ide and represented in amps (A). A voltage ($V_0$) and a steady-state current ($I_S$) present on the phase windings 19 of the electric traction motor 16 may be likewise measured proximate the electric traction motor 16.

Referring to FIG. 4, the control logic 40L of the controller 40 depicted in FIG. 2 may include various logic blocks B50-B56, with the term "logic block" as used herein referring to combined hardware and software components needed to perform a described set of functions. In a possible implementation, the control logic 40L may include a Capacitor Power Loss Model (CPLM) block B50, a Capacitor Temp Estimator (CTE) block B52, a Calculated Inverter Capability (CIC) block B54, an optional Supervisory Controls (SUP) block B53 for use with multi-inverter constructions of the electric drive system 11 shown in FIGS. 1 and 2, and a Motor Torque Local Derating (MTLD) block B56 as shown. The input signals ($CC_I$) fed into the control logic 40L are processed as shown to generate the output signals $CC_O$ and/or $CC_O$ as described below.

The demonstrated thermal behavior of the bulk capacitor 25 of FIG. 3 is dependent on multiple factors, including capacitor power loss and environmental conditions. Capacitor power loss (arrow PL) is determined via block B50 from several of the available input signals ($CC_I$), including a switching frequency ($f_{pwm}$), a modulation index (M), a power factor (PF), the direct axis and quadrature axis (d-axis and q-axis) current commands ($I_d$ and $I_q$) to the electric traction motor 16, the particular PWM switching method or type ($T_{pwm}$), e.g., six-step PWM, and the DC bus voltage ($V_{dc}$).

Block B50 may also output a Loss Model Status signal ($S_{B50}$) indicative of the present operational status of the power loss model implemented in block B50. For instance, a bit code of "1" could be used to indicate that block B50 is functioning properly and is online/available, while a bit code of "0" could indicate that the power loss model block B50 is temporarily unavailable, e.g., due to network connectivity or serial data transmission issues. When the bit code equals "0" in this instance, the controller 40 of FIG. 2 may assign a default capacitor power loss value until the problem is resolved.

Figure 5:
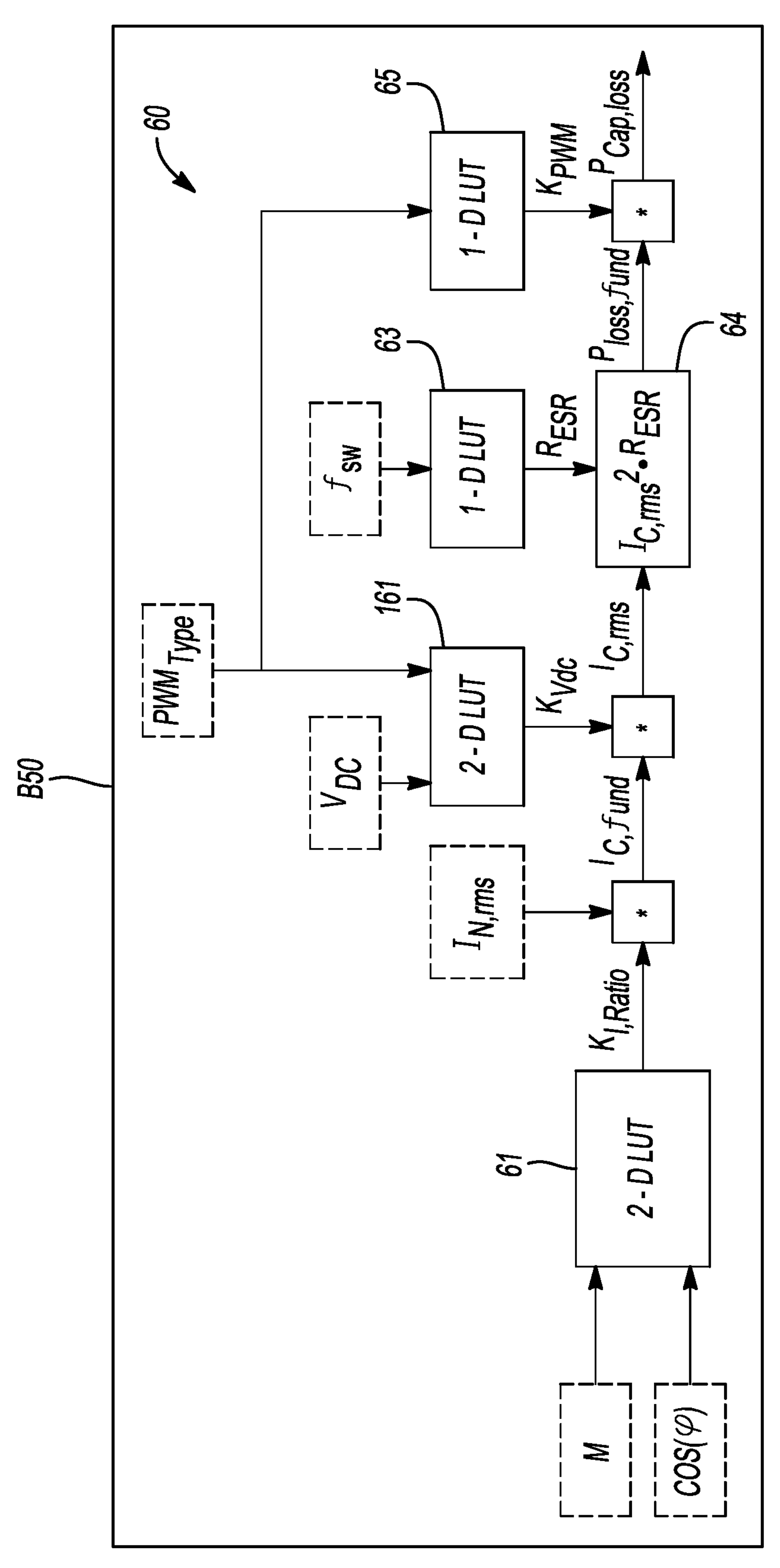
FIG. 5 is a diagram of a capacitor power loss model that is usable as part of the control logic shown in FIG. 4.

Referring briefly to FIG. 5, a representative embodiment of a Capacitor Power Loss Model 60 usable as part of block B50 may include a two-dimensional lookup table (2-D LUT) 61 populated with data for determining a capacitor current ratio ($K_{I,Ratio}$). That is, the 2D-LUT 61 may be populated with a table of capacitor current ratios determined as a function of the modulation index (M) and the power factor (PF), the latter being represented by cos (φ). The capacitor current ratio ($K_{I,Ratio}$) may be multiplied by the RMS current ($I_{N,rms}$) to calculate a fundamental capacitor current ($I_{C,fund}$) used for the linear operating region, as noted above. Here, $I_{N,rms}$ is the three-phase motor RMS current, i.e., the output current from the PIM 18.

The 2D-LUT 61 of block B50 may be further calibrated to account for the non-linear region and six-step PWM. Mathematically, the above relationships are represented as follows:

$$K_{I,Ratio}(M,\cos(\varphi)) = \frac{I_{C,fund}}{I_{N,rms}} = \sqrt{2M\left(\frac{\sqrt{3}}{4\pi} + \cos(\varphi)^2 * \left(\frac{\sqrt{3}}{\pi} - \frac{9}{16}M\right)\right)}$$

where $I_{C,fund}$ is the fundamental current through the bulk capacitor 25.

The final RMS capacitor current ($I_{C,rms}$) is also determined as a function of the DC bus voltage ($V_{DC}$). When using six-step PWM, for example, the DC bus voltage ($V_{DC}$) affects the RMS capacitor current ($I_{C,rms}$) differently than other switching control strategies. The RMS current of the bulk capacitor 25 may be calculated as follows:

$$I_{C,rms} = K_{Vdc} * I_{N,rms} * K_{I,Ratio} = K_{Vdc} * I_{N,rms}\sqrt{2M\left(\frac{\sqrt{3}}{4\pi} + \cos(\varphi)^2 * \left(\frac{\sqrt{3}}{\pi} - \frac{9}{16}M\right)\right)}$$

Capacitor losses will change with the selected PWM type ("$PWM_{Type}$"), due mainly to harmonic switching content. In one or more embodiments of the method 100, therefore, a scalar factor ($K_{PWM}$) and ($K_{VDC}$) may be applied based on the PWM type, with the scalar factors ($K_{VDC}$ and $K_{PWM}$) selected from the 2-D LUT 161 and a one-dimensional lookup table (1-D LUT) 65, respectively. The scalar factor ($K_{PWM}$) is thereafter applied to a fundamental loss calculation ($P_{loss,fund}$) to obtain the final loss ($P_{loss}$):

$$P_{loss,fund} = (I_{C,rms})^2 * R_{ESR}$$

$$P_{loss} = P_{loss,fund} * K_{PWM}$$

where $R_{ESR}$ is the frequency-dependent equivalent series resistance, possibly selected from another 1-D LUT 63.

In FIG. 4, the Capacitor Temp Estimator block B52 receives the capacitor power loss (arrow PL) and the Model Status Signal ($S_{B50}$) as inputs, along with an actual inverter temperature ($T_{18}$) of the PIM 18 (see FIGS. 2 and 3). Although current sensor hardware is not connected within the bulk capacitor 25 within the PIM 18 as noted above, it is possible to measure the temperature of the PIM 18 itself, e.g., proximate a switching junction of the power switches 55, on a DC busbar, or at another accessible location. The actual inverter temperature ($T_{18}$) is therefore used herein as an available reference value.

Figure 6:
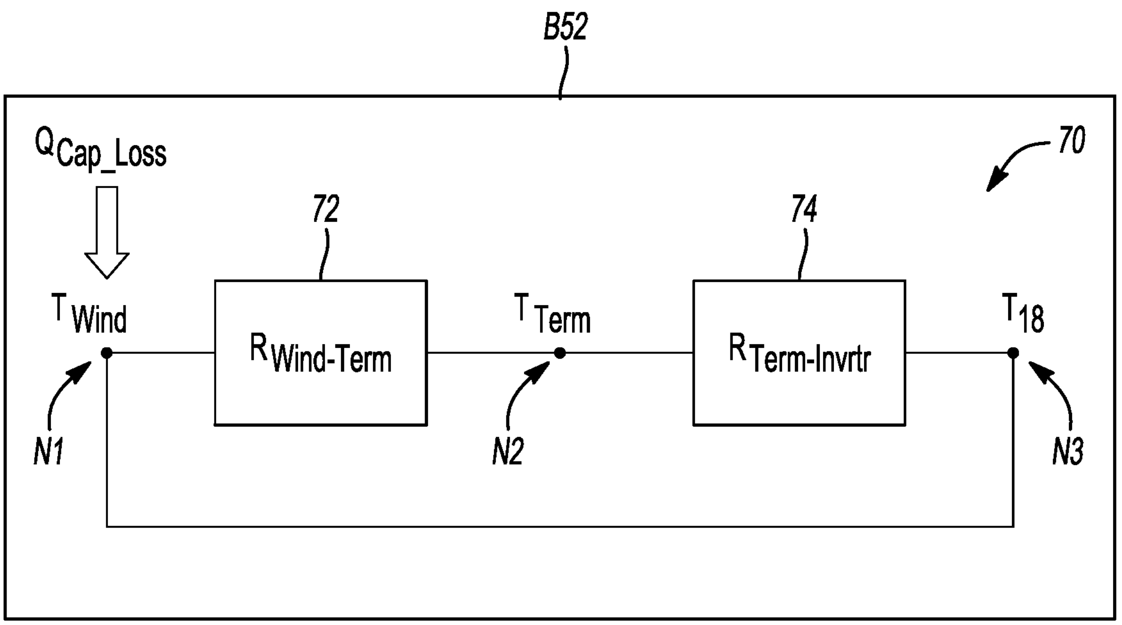
FIG. 6 is a diagram of a capacitor thermal node model usable as part of the control logic shown in FIG. 4.

Referring briefly to FIG. 6, an embodiment of the Capacitor Temp Estimator block B52 may include a Capacitor Thermal Node Model 70. The capacitor power loss $Q_{Cap\_Loss}$, which is the same value as the above-calculated value $P_{Cap,Loss}$, is used an input to model 70. As contemplated herein, model 70 may be constructed as a cross-coupled network of temperature nodes N1, N2, and N3. The terminal temperature ($T_{Term}$) of DC terminals of the bulk capacitor 25 at node N2 is dependent on the winding temperature ($T_{Wind}$) at node 1, and vice versa. The actual inverter temperature ($T_{18}$) at node N3, which may be a measured value on the PIM 18 using, e.g., a thermistor, is used in the model 70 as a reference temperature as noted above. This value affects the thermal behavior of the DC terminals of the bulk capacitor 25, while the capacitor power loss ($Q_{Cap\_Loss}$) affects the temperature ($T_{Wind}$) of the capacitor's internal windings. Using a simplified two-node embodiment as shown, node 72 ("$R_{Wind\text{-}Term}$") represents the thermal resistance at DC terminals of the bulk capacitor 25, while node 74 ("$R_{Term\text{-}Invrtr}$") represents the thermal resistance at the external terminals of the PIM 18.

A non-limiting example calculation of capacitor DC terminal temperature ($T_{Term}$) and internal winding temperature ($T_{Wind}$) at a time point (n) may be described mathematically as follows:

$$T_{Term}[n] = T_{Term}[n-1] + \frac{T_s}{C_{Term}} * \left(\frac{T_{Wind}[n-1] - T_{Term}[n-1]}{R_{Wind-Term}} + \frac{T_{18}[n-1] - T_{Term}[n-1]}{R_{Term}}\right)$$

$$T_{Wind}[n] = T_{Wind}[n-1] + \frac{T_s}{C_{Wind}} * \left(\frac{T_{Term}[n-1] - T_{Wind}[n-1]}{R_{Wind-Term}} + Q_{Cap\_loss}\right)$$

where $T_s$ is the sample time, $C_{Term}$ is the terminal thermal capacitance, i.e., the thermal capacitance of the terminals of the bulk capacitor 25, and $C_{Wind}$ is the winding thermal capacitance, i.e., the thermal capacitance of the windings of the bulk capacitor 25. Therefore, the internal winding temperature ($T_{Wind}$) is estimated by the controller 40 as the estimated internal temperature $T_{25}$, and used herein for derating and possible torque load sharing as set forth below. As will be appreciated by those skilled in the art, other thermal network structures could be used in other implementations, and therefore the above example is intended to be illustrative of one possible approach, and thus non-limiting.

Referring once again to FIG. 4, the capacitor power loss (arrow PL) and the model status signal ($S_{B50}$) are processed by the controller 40 at block B52 to estimate the temperature of the bulk capacitor 25. The estimated internal temperature ($T_{25}$) is then fed into block B54. An estimator status signal ($S_{B52}$) may be transmitted to block B54, which like the model status signal ($S_{B50}$) from block B50 could be implemented as a binary bit code to indicate the status of block B54 to downstream elements of the control logic 40L.

The optional supervisory control block B53 of FIG. 4 may be used when the electric drive system 11 of FIG. 1 is equipped with multiple inverters, e.g., the PIM 18 for powering the front road wheels 14F and the additional PIM 180 for powering the rear road wheels 14R of the representative motor vehicle 10 shown in FIG. 1. Using block B53, the controller 40 could output the control signals ($CC_O$*) that optimize a torque split between the respective front and rear drive axles 140F and 140R while maintaining a speed of the motor vehicle 10 as one of the PIMs 18 or 180 approaches its thermal limit, i.e., based on the estimated internal temperature ($T_{25}$) of the bulk capacitor 25 for each of the PIMs 18 and 180 in this two-inverter example.

Block B54 of FIG. 4 ultimately receives the estimator status signal ($SB_{52}$) and the estimated internal temperature ($T_{25}$) of the bulk capacitor 25 as inputs, and in response outputs an inverter capability signal (% CAP) as a temperature-specific calculated inverter capability. A fully-capable PIM 18, for example, would have a signal value of 100%, while a signal value of 0% could correspond to a temperature-limited PIM 18.

As part of block B54, the controller 40 of FIG. 2 may look to several different temperatures when deciding how to derate the electric traction motor 16, with the estimated internal temperature ($T_{25}$) included in such an implementation along with one or more other temperature values. The controller 40 could then derate based on the highest temperature. As an example, the actual inverter temperature ($T_{18}$) may be considered along with the estimated internal temperature ($T_{25}$). The controller 40 could compare both of these values to respective threshold limits and selectively derate the electric traction motor 16 based on the results, i.e., based on the higher of the actual and internal temperatures ($T_{18}$ and $T_{25}$, respectively). Conceivably, the estimated internal temperature ($T_{25}$) could be outside of defined thermal limits while the actual inverter temperature ($T_{18}$) remains well within its own thermal limits, in which case the controller 40 could selectively derate the electric traction motor 16 based on the elevated temperature of the bulk capacitor 25.

At the Motor Torque Local Derating block B56, the controller 40 receives the inverter capability signal (% Cap) from block B54 and outputs the control signals ($CC_O$) in response thereto. For instance, block B56 may be implemented as a lookup table indexed by the signal value of the inverter capability signal (% Cap). The control signals ($CC_O$) selectively derate the electric traction motor 16 to a degree commensurate with the signal value when the temperature of the bulk capacitor 25 exceeds a calibrated temperature limit. Derating torque output of the electric traction motor 16 when approaching a thermal limit in this manner ensures that sensitive hardware is protected.

Power loss as described above is dependent on the RMS current through the bulk capacitor 25 of FIG. 3 and the frequency-dependent equivalent series resistance ($R_{ESR}$). As physical temperature sensors for measuring the temperature of the bulk capacitor 25 are typically omitted from the structure of the PIM 18, the present approach utilizes a lookup table based on analytical equations as set forth in detail herein. The equations relate the power factor (PF) and modulation index (M) of the PIM 18 to a capacitor current ratio. Applying the capacitor current ratio to the RMS current for the electric traction motor 16 of FIG. 2 provides a linear operating region estimate of the RMS capacitor current. Calibration and modeling are used herein to determine the RMS current ratio over an entire expected range of operating conditions, including non-linear ranges.

As appreciated by those skilled in the art, current is also dependent on the DC bus voltage (Vdc). The relationship between Vdc and current also differs slightly depending on the PWM switching control technique. As described below with reference to FIGS. 7 and 8, a scalar factor ($K_{Vdc}$ or $K_{PWM}$) is therefore determined based on the particular operating voltage and switching strategy, respectively and is thereafter applied to the initial current calculation to obtain an accurate RMS current. However, it is recognized herein that different PWM switching strategies contain different frequency content. While the capacitor RMS current remains the same between the available PWM types, the differences in frequency content of the current interact with $R_{ESR}$. This interaction contributes to differences in power loss between the PWM types even at the same operating point. The scalar factor ($K_{PWM}$) applied to the RMS loss estimate depending on PWM type accounts for the differences in harmonic content. The final loss value ($P_{Cap,loss}$) of FIG. 5 is then used in the thermal model 70 of FIG. 6 as described above.

Figure 7:
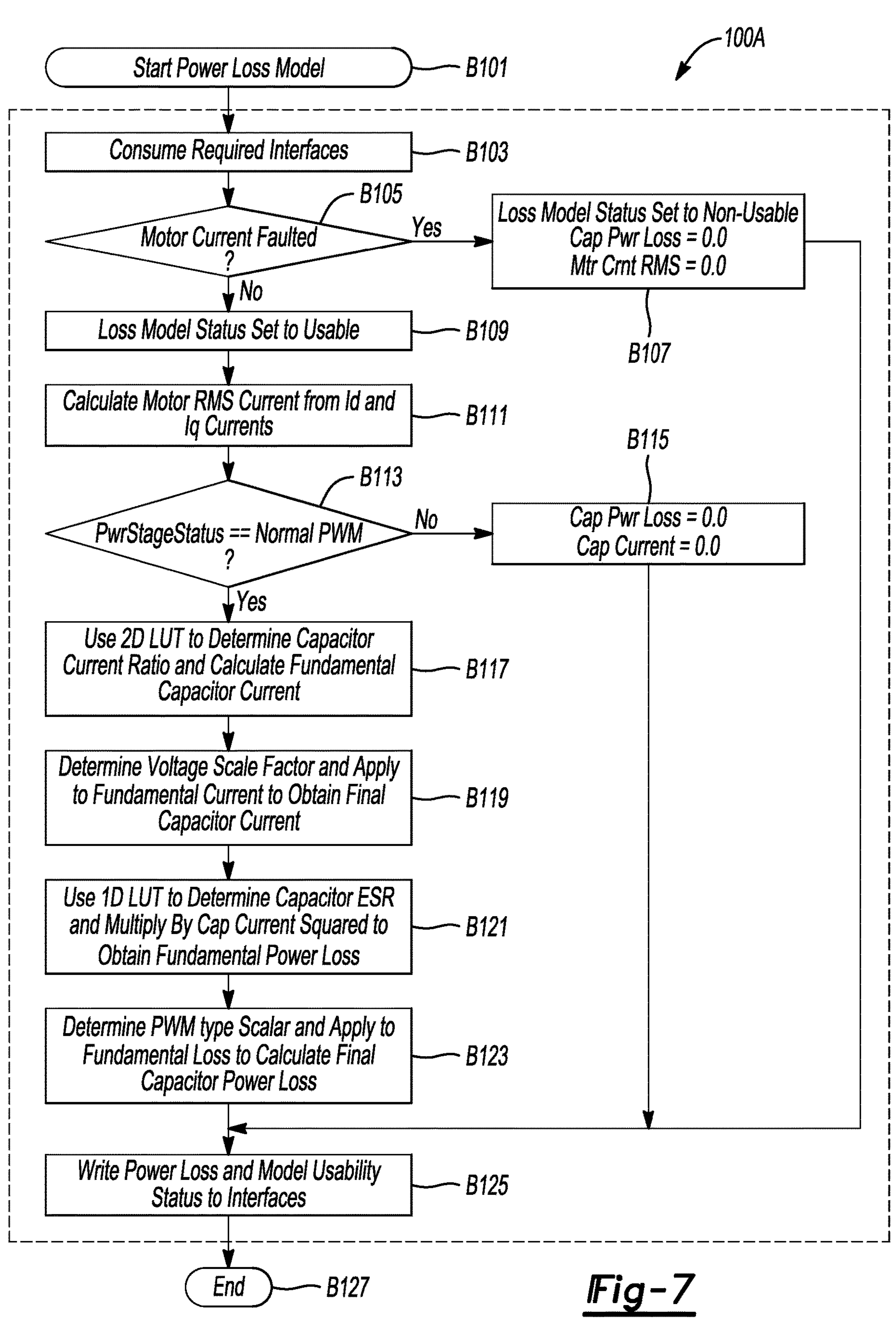
FIGS. 7 and 8 are flow charts describing a method for respectively calculating power loss and estimating an internal temperature of a bulk capacitor aboard the PIM(s) of the electric drive system shown in FIG. 3.
Figure 8:
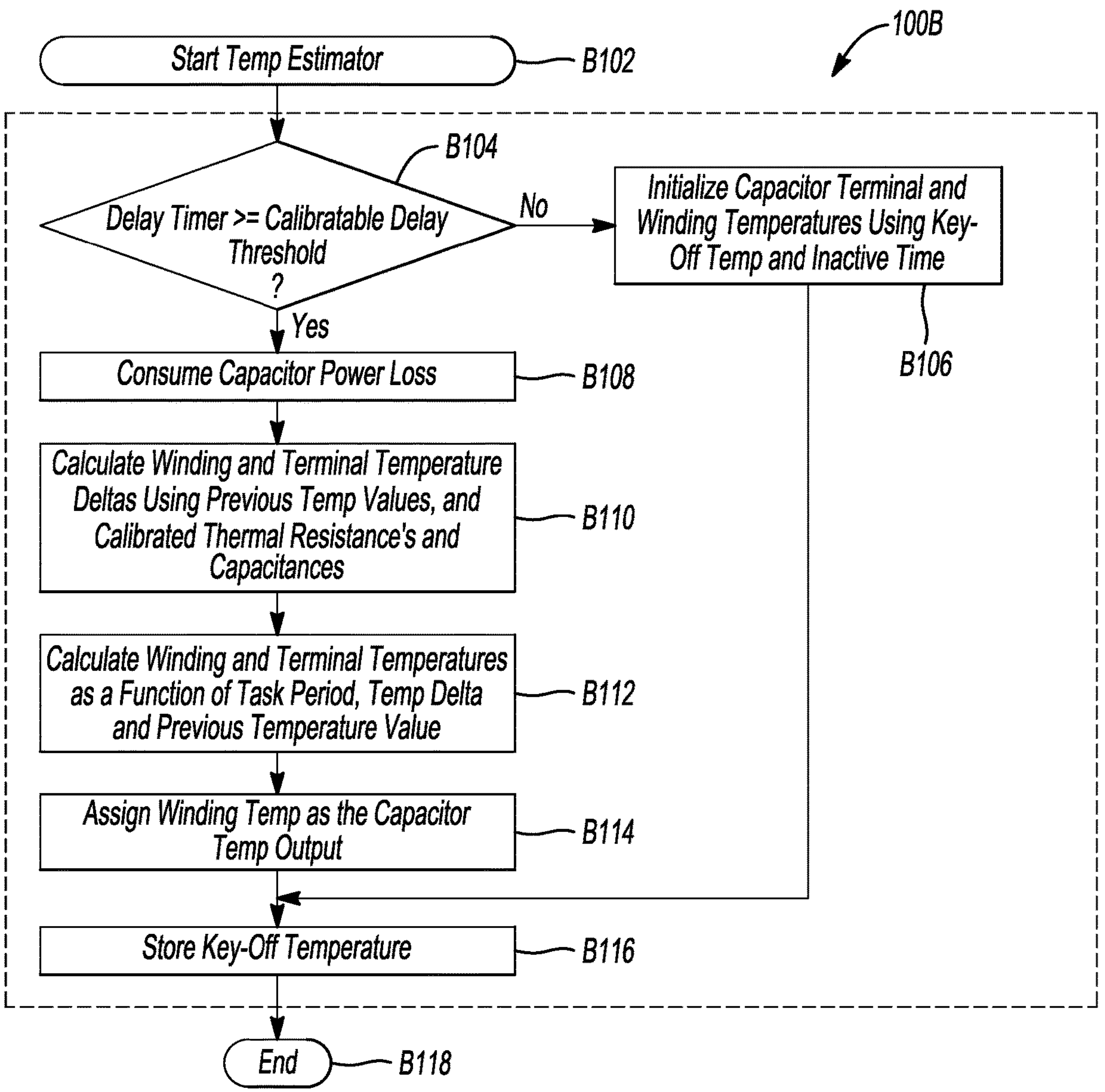

Referring now to FIGS. 7 and 8, the method 100 of the present disclosure may be described as two subroutines 100A and 100B for illustrative clarity, with the subroutines 100A and 100B described in terms of corresponding code segments or logic/terminal blocks. Subroutine 100A of FIG. 7 describes operation of block B50. Subroutine 100B of FIG. 8 describes temperature estimation as performed in block B52 of FIG. 4. In practice, subroutines 100A and 100B may be performed by the controller 40 as constituent portions of the same algorithm, as will be appreciated by those skilled in the art.

POWER LOSS MODEL: beginning with block B101 ("Start Power Loss Model") of FIG. 7, the controller 40 initiates the power loss model 60 of FIG. 5 in response to enabling conditions. For example, the controller 40 may evaluate the key-on/key-off state of the motor vehicle 10 shown in FIG. 1 to determine whether the motor vehicle 10 is presently operational, for instance in a drive mode. Subroutine 100A proceeds to block B103 once the power loss model 60 has been enabled.

Block B103 ("Consume Required Interfaces") may entail consuming any required communications interfaces, i.e., establishing wires and/or wireless communications between the controller 40 and the various components of the electric drive system 11. Block B103 could include establishing a controller area network (CAN) bus connection in a possible embodiment, such that the controller 40 is in communication with corresponding control processors (not shown) for the battery pack 12, the electric traction motor 16, and the PIM 18. Subroutine 100A proceeds to block B105 after completing this action.

Block B105 ("Motor Current Fault?") includes determining, via the controller 40, whether one or more predetermined electrical faults are active. For example, the controller 40 could determine if a motor current fault is active for the electric traction motor 16. The subroutine 100A proceeds to block B107 when such faults are detected, and to block B109 in the alternative.

At block B107 ("Loss Model Status Set to Non-Usable", "Cap Pwr Loss=0.0", "Mtr Crnt RMS=0.0"), the controller 40 may set the Loss Model Status to "non-usable" or another suitable status. The controller 40 may also set the capacitor power loss and motor current RMS to zero before proceeding to block B125.

At block B109 ("Loss Model Status Set to Usable"), the controller 40 sets the Loss Model Status of block B50 to "usable", e.g., by setting a bit code to 1 as noted above. This action signals that the Loss Model 60 (FIG. 5) used in block B50 is available and useable. Subroutine 100A thereafter proceeds to block B111.

Block B111 ("Calculate Motor RMS Current from $I_d$ and $I_q$ Currents") of FIG. 7 includes calculating the motor RMS current from the direct and quadrature-axis current, i.e., $I_d$ and $I_q$, as appreciated in the art. Block B111 may entail using a predetermined formula or accessing a pre-populated lookup table for this purpose in different embodiments. The subroutine 100A then proceeds to block B113.

Block B113 ("PwrStageStatus==Normal PWM?") entails determining via the controller 40 whether the PIM 18 is operating as normal/expected, or if the PIM 18 is in a three-phase open or short circuit condition. Block B113 thus determines the operating status of the power switches 55 of the PIM 18, as depicted in FIG. 3. The controller 40 assumes that current is essentially zero through the bulk capacitor 25 when the power stage is not operating in a normal or properly functioning PWM switching mode, in which case the subroutine 100A proceeds to block B115. Subroutine 100A instead proceeds to block B117 when normal PWM operation is detected.

At block B115 ("Cap Pw loss=0.0", "Cap Current=0.0"), the controller 40 may set the capacitor power loss and the capacitor current to zero in memory 44M of FIG. 2. Subroutine 100A then proceeds to block B125.

Block B117 may include using the 2-D LUT 61 of FIG. 5 to determine the capacitor current ratio ($K_{I,Ratio}$) and calculate the fundamental capacitor current ($I_{C,fund}$), as described above. The subroutine 100A thereafter proceeds to block B119.

Block B119 of FIG. 7 includes determining a voltage scale factor ($K_{Vdc}$), and applying the same to the fundamental current ($I_{C,fund}$) to obtain the final RMS capacitor current ($I_{Crms}$). Subroutine 100A then continues to block B121.

At block B121, the controller 40 may further refine the results of the control logic 40L of FIG. 4 using the 1-D LUT 63 of FIG. 5 to determine the capacitor $R_{ESR}$ value. This value is based on the switching frequency ($f_{SW}$), and may be multiplied by the square of the capacitor current to obtain the fundamental power loss, i.e.:

$$I_{C,rms}{}^2 * R_{ESR} = P_{loss,fund}$$

At block B123 of FIG. 7, the controller 40 may next determine the scalar value for the particular PWM type being used. This value may be applied to the fundamental loss ($P_{loss,fund}$) to calculate the final capacitor power loss ($P_{Cap,loss}$). As shown in FIG. 5, the scalar ($K_{PWM}$) may be extracted from the 1-D LUT 65. Subroutine 100A then proceeds to block B125.

Block B125 of FIG. 7 may include writing the power loss and model usability statuses to the relevant interfaces, e.g., as signals PL and $S_{B50}$ of FIG. 5. These values are then processed as described above with reference to FIG. 6. Subroutine 100A then proceeds to block B127 ("End") and is completed, resuming anew with block B102.

CAPACITOR TEMP ESTIMATOR: subroutine 100B of FIG. 8 pertains to implementation of the temperature estimator block B52 of FIG. 6. At block B102, the controller 40 of FIG. 2 may initiate the temperature estimator block B52 in response to enabling conditions, e.g., a key-on cycle of the motor vehicle 10, receipt of the estimated internal temperature ($T_{25}$) and estimator status signal ($S_{B52}$), etc. Subroutine 100B proceeds to block B104 upon initialization of the estimator block B52.

At block B104 ("Delay Timer>=Calibratable Delay Threshold"), the controller 40 may determine if a value of a delay timer exceeds a calibrated delay threshold, i.e., an elapsed amount of time from initiation at block B102. To implement block B104, the controller 40 may count up commencing with a key-on of the motor vehicle 10. A threshold of, e.g., about 2-3 seconds may be used for this purpose. Subroutine 100B proceeds to block B108 when the value of the delay timer exceeds the calibrated delay threshold. Subroutine 100B otherwise proceeds to block B106.

At block B106 ("Initialize Capacitor Terminal and Winding Temperatures Using Key-Off Temp and Inactive Time"), the controller 40 of FIG. 2 may initialize the capacitor terminal temperature ($T_{Term}$) and winding temperature ($T_{Wind}$) of FIG. 6 using a recoded key-off temperature and inactivation time. That is, when the calibrated delay threshold of block B104 has not yet elapsed, the controller 40 may estimate the temperature of the bulk capacitor 25 using an initialization strategy, e.g., a previously-recorded key-off temperature and an elapsed amount of time that the motor vehicle 10 of FIG. 1 has been inactive. That is, when the motor vehicle 10 is initially turned off, the bulk capacitor 25 will begin to cool off in an exponential manner, thus enabling the controller 40 to temporarily predict the estimated internal temperature ($T_{25}$) when the motor vehicle 10 of FIG. 1 is in an OFF operating state, using a default approach. Doing this also allows the controller 40 to have access to an accurate starting temperature of the bulk capacitor 25 once the calibrated delay threshold has elapsed. Subroutine 100B may then proceed to block B116.

Block B108 ("Consume Capacitor Power Loss") entails receiving the capacitor power loss (PL) from block B50 of FIG. 4, as calculated via subroutine 100A of FIG. 7. Subroutine 100B then proceeds to block B110.

Block B110 may include calculating the winding and terminal temperature deltas using previous temperature values, i.e., at time (n−1), and calibrated thermal resistances and capacitances. Subroutine 100B thereafter proceeds to block B112.

At block B112, the controller 40 calculates the winding and terminal temperatures ($T_{Wind}$ and $T_{Term}$) of FIG. 6 as a function of the task period, temperature deltas, and previous temperature values as set forth in detail above. Subroutine 100B then proceeds to block B114.

Still referring to FIG. 8, block B114 ("Assign Winding Temp as the Capacitor Temp Output") may include assigning winding temperatures as the current capacitor temperature output. The subroutine 100B then proceeds to block B116.

Block B116 ("Store Key-Off Temperature") entails storing the key-off temperature for use in predicting the estimated internal temperature ($T_{25}$) of the bulk capacitor 25 during key-off periods, as noted above. Subroutine 100B ends with block B118 ("End"), with the method 100 of FIGS. 7 and 8 proceeding in a loop during key-on and key-off cycles of the motor vehicle 10 as described above.

Using the estimation and related control strategy set forth above, an internal temperature of the bulk capacitor 25 of the PIM 18 is estimated during ongoing operation of the motor vehicle 10 as well as during periods during which the motor vehicle 10 is in an OFF operating state. The estimated internal temperature ($T_{25}$) is usable by the controller 40 in a host of control actions, including temperature threshold-based selective derating of the electric traction motor 16 of FIG. 2 and/or torque allocation/load sharing across multiple drive axles. While derating based on the estimated internal temperature ($T_{25}$) is not expected to be needed under normal operating conditions, the present teachings would protect against extreme use cases or abuse scenarios. That is, the bulk capacitor 25 would not have to be designed to withstand "worse case" uses as there would instead be a software feedback mechanism for derating power to the motor 16 when the estimated internal temperature ($T_{25}$) approaches its thermal limit. This in turn ensures the integrity of the electric drive system 11 and helps prevent possible hardware damage. In the case where multiple inverters are used as part of the electric drive system 11, temperature feedback is used to balance thermal loads between different components and achieve improved performance.

As part of the present approach, one may collect field data for the estimated internal temperature ($T_{25}$) over time to assess temperature trends, and to better understand the various real-world use cases and life/damage of the bulk capacitor 25. Such information would help indicate opportunities for possibly downsizing the bulk capacitor 25, with associated cost, mass, and weight reductions. As the use of a physical sensor for measuring the temperature of the bulk capacitor 25 is not practical in view of the negative effect on the overall DC link structure, reliance on the estimated value as specified herein allows the controller 40 to consider the estimated internal temperature $T_{25}$ in the overall control of the electric drive system 11. These and other attendant benefits will be recognized by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An electric drive system comprising:
a direct current (DC) power supply;
a rotary electric machine connected to a load;
a power inverter module (PIM) comprising:
 a bulk capacitor connected to the DC power supply; and
 a plurality of power switches having an output side connected to the rotary electric machine and an input side connected to the bulk capacitor; and
a controller programmed with a two-dimensional lookup table that relates a modulation index of the PIM and a power factor of the PIM to a capacitor current ratio, and programmed, in response to an enabling condition, to estimate an internal temperature of the bulk capacitor as an estimated internal temperature, and to selectively derate the rotary electric machine in response to the estimated internal temperature, wherein the controller is configured to estimate a root mean square (RMS) current of the bulk capacitor using the capacitor current ratio, and to estimate the internal temperature of the bulk capacitor using the RMS current.

2. The electric drive system of claim 1, wherein:
the DC power supply includes a traction battery pack for use aboard a motor vehicle.

3. The electric drive system of claim 2, wherein the enabling condition is a key-on event of the motor vehicle, and wherein the controller is configured to:

record the estimated internal temperature as a recorded key-off temperature in response to a key-off event of the motor vehicle, wherein the key-off event places the motor vehicle into an OFF operating state; and temporarily estimate the internal temperature of the PIM using the recorded key-off temperature while the motor vehicle is in an OFF operating state.

4. The electric drive system of claim 2, wherein:

the electric machine includes an electric traction motor; and the load includes one or more road wheels of the motor vehicle.

5. The electric drive system of claim 1, wherein the controller is programmed to control an ON/OFF switching state of the power switches using a predetermined pulse width modulation (PWM) strategy, and to estimate the internal temperature of the PIM using a scalar factor selected from a one-dimensional lookup table based on the predetermined PWM strategy.

6. The electric drive system of claim 5, wherein the predetermined PWM strategy includes six-step PWM.

7. The electric drive system of claim 5, wherein the controller is programmed with a power loss model configured to output a power loss value of the bulk capacitor in response to a set of input signals, the set of input signals including a switching frequency of the power switches, the modulation index of the PIM, the power factor of the PIM, a d-axis current command, a q-axis current command, a DC voltage from the DC power supply, and the predetermined PWM strategy.

8. The electric drive system of claim 1, wherein the controller includes a thermal model of the bulk capacitor, the thermal model including a cross-coupled network of temperature nodes of the bulk capacitor and the PIM, and wherein the controller is configured to estimate the internal temperature of the bulk capacitor using the thermal model.

9. The electric drive system of claim 1, wherein the PIM includes a plurality of PIMs and the rotary electric machine includes a plurality of rotary electric machines each connected to a corresponding one of the PIMs, and wherein the controller is configured to allocate an output torque from each respective one of the rotary electric machines to at least one load based at least in part on the estimated internal temperature of the bulk capacitor.

10. A method for use with an electric drive system, the method comprising:

estimating, via a controller in response to an enabling condition, an internal temperature of a bulk capacitor of a power inverter module (PIM) of the electric drive system, wherein the electric drive system comprises the PIM, a direct current (DC) power supply connected to the PIM, and a rotary electric machine connected to the PIM and to a load;

selectively derating the rotary electric machine via switching control of a plurality of power switches of the PIM in response to the estimated internal temperature, including limiting a maximum output torque, a maximum speed, or the maximum output torque and the maximum speed of the rotary electric machine; and controlling an ON/OFF switching state of the power switches using a predetermined pulse width modulation (PWM) strategy, wherein estimating the internal temperature of the bulk capacitor includes applying a scalar factor that is selected from a one-dimensional lookup table based on the predetermined PWM strategy.

11. The method of claim 10, wherein selectively derating the rotary electric machine includes limiting the maximum output torque of the rotary electric machine.

12. The method of claim 11, wherein the rotary electric machine includes an electric traction motor and the load includes one or more road wheels of a motor vehicle.

13. The method of claim 12, wherein the enabling condition is a key-on event of the motor vehicle, further comprising:

recording the internal temperature of the bulk capacitor as a recorded key-off temperature in response to a key-off event of the motor vehicle, wherein the key-off event transitions the motor vehicle to an OFF operating state; and temporarily estimating the internal temperature of the PIM using the recorded key-off temperature while the motor vehicle is in the OFF operating state.

14. The method of claim 10, wherein selectively derating the rotary electric machine includes limiting the maximum speed of the rotary electric machine.

15. The method of claim 10, further comprising:

determining a power loss value of the bulk capacitor via the controller in response to a set of input signals using a power loss model, the set of input signals including a switching frequency of the power switches, a modulation index of the PIM, a power factor of the PIM, a d-axis current command, a q-axis current command, a DC voltage from the DC power supply, and the predetermined PWM strategy.

16. The method of claim 10, wherein estimating the internal temperature of the bulk capacitor includes using a thermal model of the bulk capacitor, the thermal model including a cross-coupled network of temperature nodes of the bulk capacitor and the PIM.

17. The method of claim 10, wherein the PIM includes a plurality of PIMs and the rotary electric machine includes a plurality of rotary electric machines each connected to a corresponding one of the PIMs, the method further comprising:

allocating an output torque from each respective one of the rotary electric machines to the load based at least in part on the estimated internal temperature of the bulk capacitor.

18. The method of claim 11, further comprising:

extracting a capacitor current ratio, via the controller, from a two-dimensional lookup table that relates a modulation index of the PIM and a power factor of the PIM to the capacitor current ratio;

calculating a root mean square (RMS) current of the bulk capacitor using the capacitor current ratio; and estimating the internal temperature of the bulk capacitor using the RMS current of the bulk capacitor.

19. A method for use with an electric drive system of a motor vehicle, the method comprising:

estimating, via a controller of the motor vehicle in response to an enabling condition, an internal temperature of a bulk capacitor of a power inverter module (PIM) of the electric drive system, wherein the electric drive system comprises the PIM, a direct current (DC) traction battery pack connected to the PIM, and a polyphase rotary electric traction motor connected to the PIM and to one or more road wheels of the motor vehicle; and selectively derating a maximum torque a maximum speed, or the maximum output torque and the maximum speed of the polyphase rotary electric machine, via switching control a plurality of power switches of the PIM, in response to the estimated internal temperature, wherein estimating the internal temperature of the bulk capacitor includes:

extracting a capacitor current ratio from a two-dimensional lookup table that relates a modulation index of the PIM and a power factor of the PIM to the capacitor current ratio;

calculating a root mean square (RMS) current of the capacitor using the capacitor current ratio;

determining a power loss value of the bulk capacitor using a thermal model of the bulk capacitor and a power loss model of the bulk capacitor, the power loss model having a set of input signals including a switching frequency of the power switches, a modulation index of the PIM, a power factor of the PIM, a d-axis current command, a q-axis current command, a DC voltage from the DC traction battery pack, and a predetermined pulse width modulation (PWM) strategy; and estimating the internal temperature of the bulk capacitor using the RMS current and the power loss value.

20. The method of claim 19, wherein the enabling condition includes a key-on event of the motor vehicle, the method comprising:

recording the internal temperature of the bulk capacitor as a recorded key-off temperature in response to a key-off event of the motor vehicle, wherein the key-off event transitions the motor vehicle to an OFF operating state; and temporarily estimating the internal temperature of the PIM using the recorded key-off temperature while the motor vehicle is in the OFF operating state.

* * * * *